(12) United States Patent
Rottach

(10) Patent No.: US 11,781,641 B2
(45) Date of Patent: Oct. 10, 2023

(54) ARRANGEMENT COMPRISING AN ELECTRIC MACHINE AND A GEARBOX AND VEHICLE

(71) Applicant: Valeo Siemens eAutomotive Germany GmbH, Erlangen (DE)

(72) Inventor: Arnim-Sebastian Rottach, Ravensburg (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 551 days.

(21) Appl. No.: 16/967,567

(22) PCT Filed: Nov. 15, 2018

(86) PCT No.: PCT/EP2018/081373
§ 371 (c)(1),
(2) Date: Aug. 5, 2020

(87) PCT Pub. No.: WO2019/161948
PCT Pub. Date: Aug. 29, 2019

(65) Prior Publication Data
US 2021/0148450 A1 May 20, 2021

(30) Foreign Application Priority Data
Feb. 23, 2018 (EP) ..................................... 18158324

(51) Int. Cl.
*F16H 57/04* (2010.01)
*B60K 1/00* (2006.01)
*F16H 57/02* (2012.01)

(52) U.S. Cl.
CPC ....... *F16H 57/043* (2013.01); *F16H 57/0423* (2013.01); *B60K 1/00* (2013.01);
(Continued)

(58) Field of Classification Search
CPC . H02K 9/197; H02K 1/32; H02K 9/19; F16H 57/043; F16H 2057/02034
See application file for complete search history.

(56) References Cited

U.S. PATENT DOCUMENTS 3,060,335 A * 10/1962 Greenwald ............ H02K 5/203
310/58
3,260,872 A * 7/1966 Potter .................... H02K 9/197
310/61
(Continued)

FOREIGN PATENT DOCUMENTS

| JP | H09-154257 A | 6/1997 |
|----|--------------|--------|
| JP | 2015-091198 A | 5/2015 |
| WO | 2016/050534 A1 | 4/2016 |

OTHER PUBLICATIONS

PCT/ISA/210, "International Search Report for International Application No. PCT/EP2018/081373," dated Feb. 5, 2019.

*Primary Examiner* — Jake Cook
(74) *Attorney, Agent, or Firm* — Manabu Kanesaka

(57) ABSTRACT

Arrangement (1) comprising an electric machine (2), a gearbox (3), a shaft (9) coupling the electric machine (2) with the gearbox (3) and having an axial blind bore (18) extending from a machine-side end (19) of the shaft (9) into the gearbox (3), a coolant insertion element (21) configured to supply a coolant into the bore (18) and a coolant conduction element (22) extending inside the bore (18) from the machine-side end (19) into the gearbox (3) and defining a flow path (23) for the inserted coolant.

12 Claims, 4 Drawing Sheets

Figure 1:
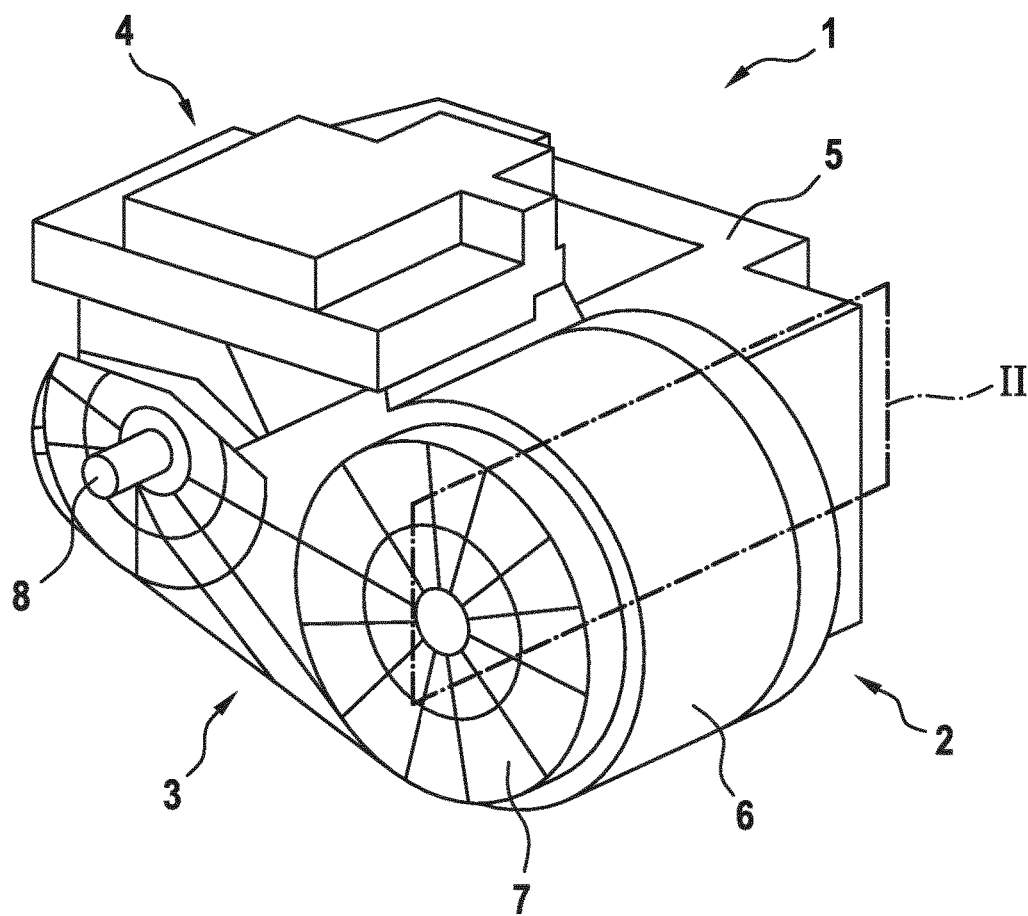

(52) U.S. Cl.
 CPC .... *B60K 2001/003* (2013.01); *F16H 57/0471* (2013.01); *F16H 57/0476* (2013.01); *F16H 2057/02034* (2013.01)

(56) References Cited

U.S. PATENT DOCUMENTS

| | | | |
|---|---|---|---|
| 3,562,564 A | 2/1971 | Potter | |
| 6,191,511 B1* | 2/2001 | Zysset | H02K 9/197 |
| | | | 310/59 |
| 7,489,057 B2* | 2/2009 | Zhou | H02K 9/197 |
| | | | 310/61 |
| 8,450,888 B2* | 5/2013 | Shafer | H02K 5/203 |
| | | | 310/60 A |
| 2018/0269743 A1 | 9/2018 | Büttner et al. | |
| 2019/0186622 A1* | 6/2019 | Ishikawa | H02K 7/116 |

* cited by examiner

ARRANGEMENT COMPRISING AN ELECTRIC MACHINE AND A GEARBOX AND VEHICLE

RELATED APPLICATIONS

The present application is National Phase of International Application No. PCT/EP2018/081373 filed Nov. 15, 2018, and claims priority from European Application No. 18158324.6, filed Feb. 23, 2018, the disclosure of which is hereby incorporated by reference herein in its entirety.

The present invention relates to an arrangement comprising an electric machine and a gearbox. Besides, the invention relates to a vehicle.

Arrangements comprising an electric machine and a gearbox have to fulfill high requirements concerning power density, particularly when being used as an integrated drive system for an electric vehicle. Consequently, each component of the arrangement is designed to be operated near its thermal limitations. With respect to the gearbox, a temperature of the lubricant collected in an oil sump may not exceed a maximum rated temperature of typically 120° C. to 140° C. for a specified time span. Otherwise, the heat generated by rolling contacts of the gearbox cannot be dissipated sufficiently, which may result in a collapse of a lubricating film causing higher abrasion. Thereby, the gearbox may heat up and be damaged.

Disadvantageously, thermal losses of the rotor heat up a shaft coupling the electric machine with the gearbox. The shaft conducts the heat via seals and bearings into the gearbox.

WO 2016/050534 A1 discloses an electric machine comprising a rotor with a shaft having an axial bore and a flow guidance element extending into the axial bore such that a cooling liquid can flow into the axial bore. The flow guidance element is supplied with the coolant via a coolant inlet.

It is an object of the invention to provide an improved arrangement comprising an electric machine and a gearbox, particularly allowing an improved heat dissipation from the gearbox.

According to the present invention, the above object is solved by an arrangement comprising an electric machine, a gearbox, a shaft coupling the electric machine with the gearbox and having an axial blind bore extending from a machine-side end of the shaft into the gearbox, a coolant insertion element configured to supply a coolant into the bore and a coolant conduction element extending inside the bore from the machine-side end into the gearbox and defining a flow path for the inserted coolant.

The present invention is based upon the consideration to extend a fluid cooling of the shaft to the gearbox. As heat generated by a rotor is conducted into the gearbox by the shaft, cooling the shaft between the machine-side end and the gearbox effectively dissipates the heat at the position where it intrudes the gearbox, advantageously. Furthermore, heat generated by rolling contacts of gears of the gearbox is dissipated by the coolant. Therein, a lubricant film wetting the shaft establishes a heat connection to the whole amount of lubricant inside the gearbox, which is effectively cooled via the shaft.

Typically, the electric machine and the gearbox are arranged within the same housing. Thus, the arrangement can realize an integrated drive system, particularly for a vehicle. Preferably, the electric machine is configured to provide a rotation rate of 12.000 min$^{-1}$, preferably 15.000 min$^{-1}$, more preferably 20.000 min$^{-1}$, within a non-overloaded operation range. The aforementioned rotation rates allow to achieve the high power densities desired for modern automotive drive systems. In particular, the electric machine is a permanent-magnet synchronous machine. The shaft may be considered as a main shaft of the arrangement. The rotor and/or a gear may be attached to the shaft in a torque-proof manner. Typically, the coolant comprises water and/or glycol. The machine-side end may be considered as non-drive end (NDE) of the shaft.

Preferably, the bore is realized by the shaft having a through hole, which is axially closed by means of a closing element. The closing element may comprise a plug, a stud or a nut. The shaft may be made of a tube-formed raw component or may be made by drilling the through hole.

Therein, the closing element mounts a bearing supporting the shaft and/or mounts a gear of the gearbox. Particularly, the nut mounting the bearing and/or the gear may be screwed into the through hole at a gearbox-side end of the shaft. Additionally, a sealing means may be applied to the closing element in order to avoid that the coolant gets in contact with the lubricant inside the gearbox.

Advantageously, a blind end portion of the shaft has a deflection means configured to swirl the coolant. When the coolant flows against the deflection means, turbulences improving the heat dissipation are generated.

The deflection means has a bore-side surface being non-perpendicular to a rotation axis of the shaft. In other words, a normal of the bore-side surface and the rotation axis may enclose an angle being greater than zero, preferably an angle of at least 1°, more preferably an angle of at least 5°.

Preferably, the defection means is realized by the closing element. Therefore, a section of the closing element facing the machine side-end may be formed to have the non-perpendicular bore-side surface.

The coolant conduction element may be arranged such that the shaft rotates around it. It is, however, also possible that the coolant conduction element is configured to rotate with the rotor, e.g. by being arranged in a torque-proof manner with the rotor. Therein, the coolant conduction element may be rotatable relative to the coolant insertion element.

With respect to the inventive arrangement it is preferred that the coolant conduction element is configured to separate the bore into an inner section and into an outer section, wherein one section realizes the flowing path. The coolant conduction element may have a closed cross-section surrounding the inner section. Particularly, the coolant conduction element is a pipe or a tube. Thus, the coolant conduction element may be considered as a cooling lance.

Preferably, the inner section realizes the flowing path. Thus, the coolant flows inside the coolant conduction element up to the blind end portion, where it leaks the inner section and gets in contact to the shaft. After leaking the inner section, the coolant flows back to the machine-side end being in contact with the shaft. Alternatively, the coolant flows into the bore along the outer section and is conducted to flow back to the machine-side end through the inner section.

The conduction element may further comprise an open circumferential contour, particularly a helical contour, extending in axial direction of the shaft and protruding into the outer section. Thus, when flowing back to the machine-side end, turbulences are generated by the contour. Furthermore, a rotation of the shaft generates a movement of the coolant in axial direction as the contour does not follow the rotation of the shaft.

Although the coolant conduction element and the contour may be formed by a single piece, it is preferred that the contour is realized by a contour element arranged around the coolant conduction element. The contour element may be a wire or a ribbon and/or may be made of a polymer and/or a metal. Preferably, the contour element is a molded part pushed over or wrapped around the coolant conduction element. The contour element may be fixed by means of a press fit. Alternatively, the contour element may be realized by molding it on the coolant conduction element.

Furthermore, the arrangement may comprise a radial shaft seal arranged between the rotor and a gear attached to the shaft, wherein the radial shaft seal is coolable by the coolant. Typically, the radial shaft seal prevents the lubricant from entering an air gap of the electric machine. Thus, it is preferably arranged between a bearing arranged in a drive end shield (DE shield) of the electric machine and the rotor. As the radial shaft seal may be subject to high abrasion when overheating, the inventive cooling strategy allows a longer lifetime of the radial shaft seal.

Aside, the present invention relates to a vehicle comprising an arrangement according to the invention, wherein the arrangement is configured to drive the vehicle.

All statements referring to the inventive arrangement apply analogously to the inventive vehicle, so that the above-mentioned advantages of the inventive arrangement may be achieved as well.

Figure 2:
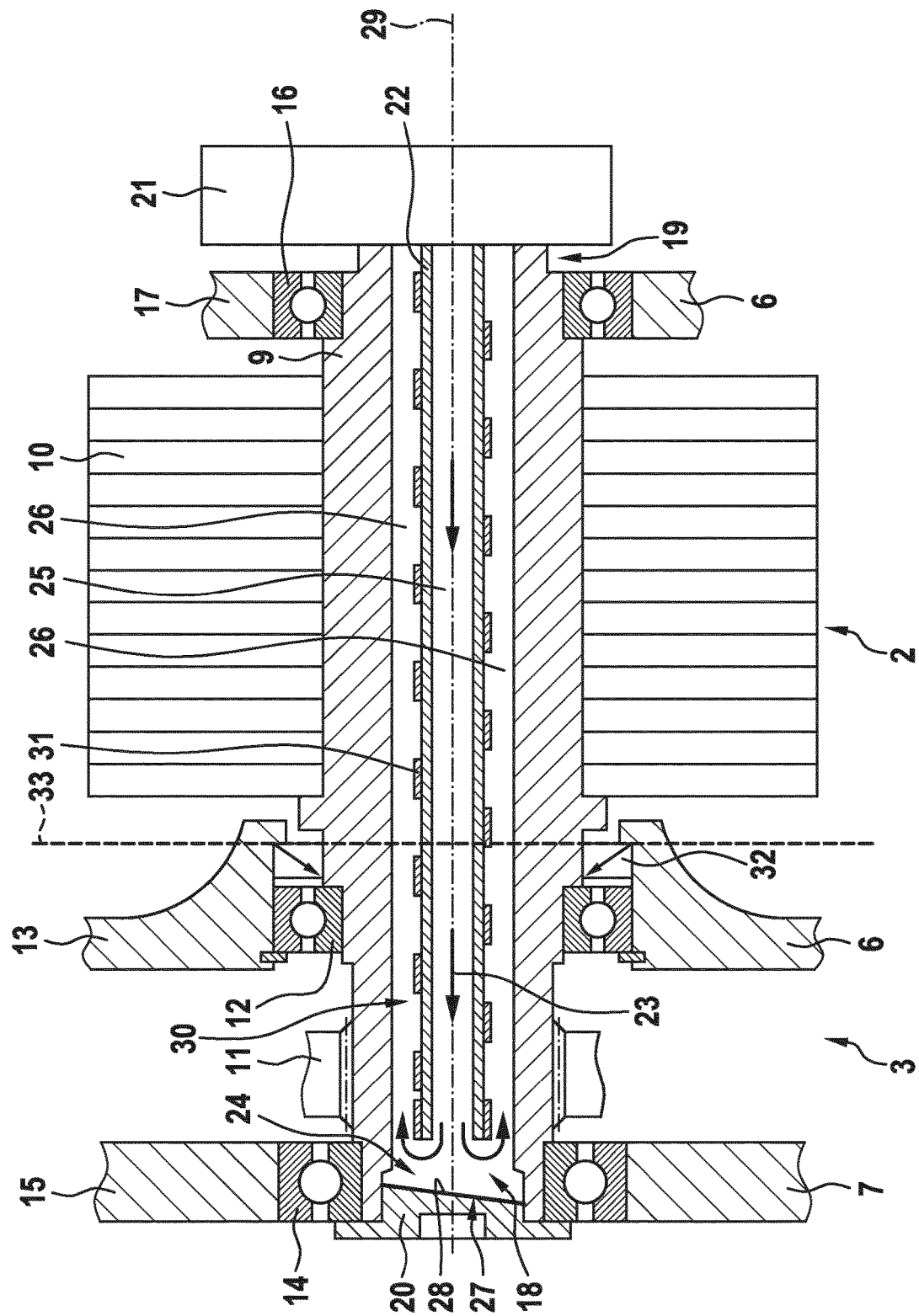
Figure 3:
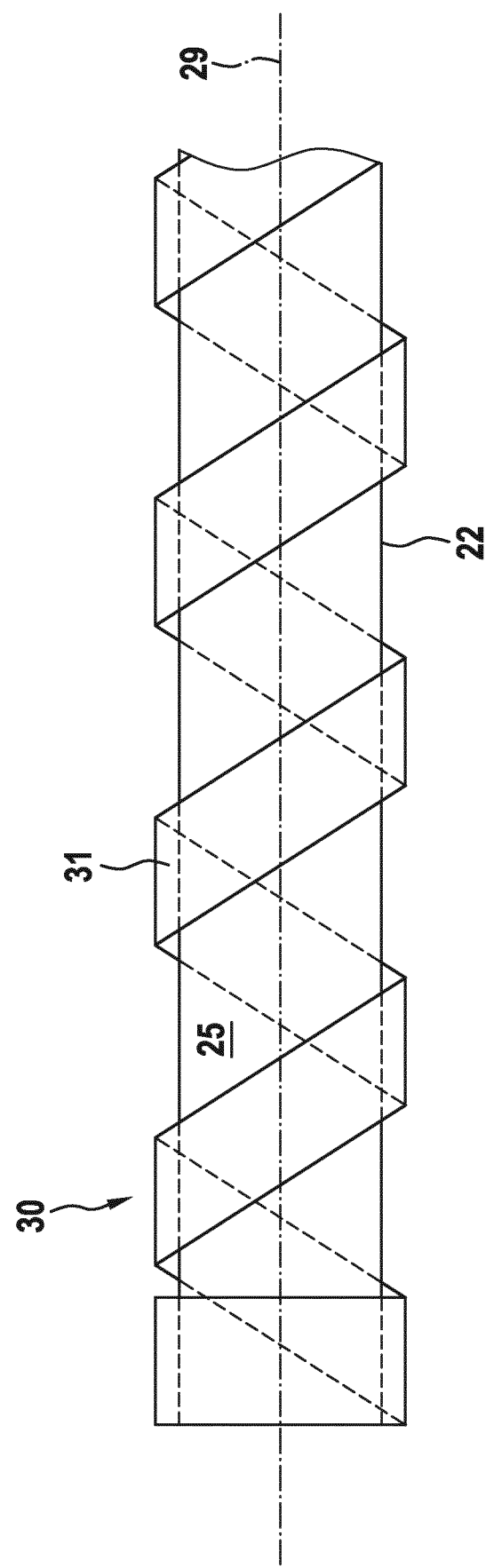

Further details and advantages of the invention are disclosed in the following, wherein reference is made to the schematic drawings showing:

FIG. 1 a perspective view of an embodiment of an inventive arrangement comprising an electric machine and a gearbox;

FIG. 2 a cross-sectional view of the arrangement along a sectional plane II shown in FIG. 1;

FIG. 3 a cross-sectional view of a coolant conduction element; and

Figure 4:
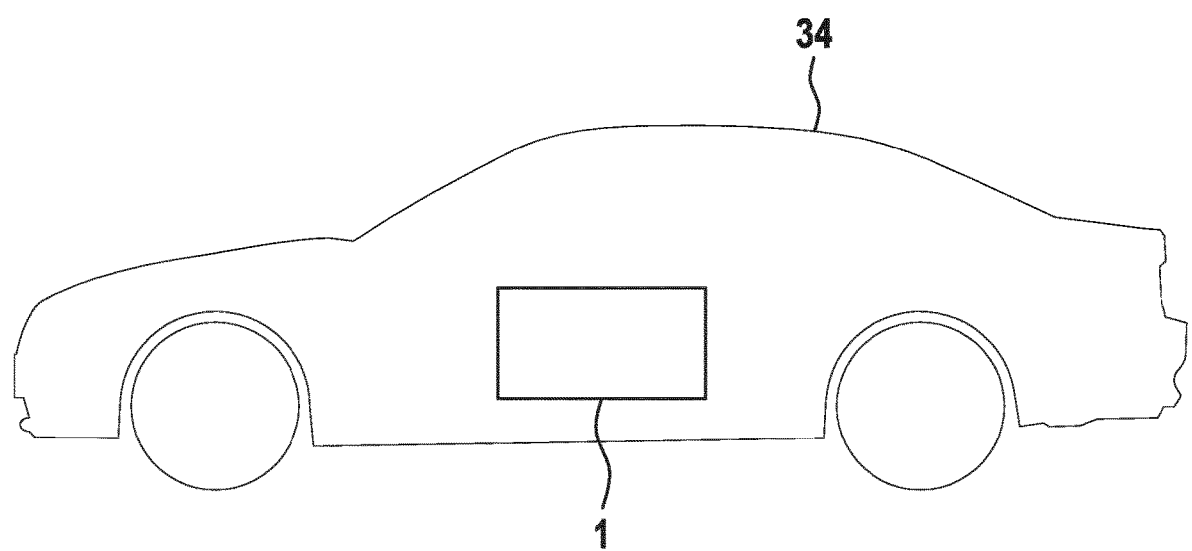

FIG. 4 a block diagram of an embodiment of an inventive vehicle.

FIG. 1 is a perspective view of an embodiment of an arrangement 1 comprising an electric machine 2 and a gearbox 3. The arrangement 1 is an integrated drive system for a vehicle with high power density, wherein the electric machine 2 is capable of providing rotation rates up to 22.000 $min^{-1}$ within a non-overloaded operation range.

The arrangement 1 further comprises an inverter 4 configured to supply the electric machine 2 electrically. The electric machine 2, the gearbox 3 and the inverter 4 have a common housing 5 with a machine housing 6 and with a gearbox housing 7. The housing 5 may be realized by a one-part housing, wherein the machine housing 6 and the gearbox housing 7 are corresponding housing sections, or by a two-part or multi-part housing.

The gearbox 3 comprises two side shafts 8, wherein one side shaft is hidden in FIG. 1. The side shafts 8 are coupled by means of the differential gear of the gearbox 3 and are attachable to wheel hubs of the vehicle.

FIG. 2 is a cross-sectional view of the arrangement 1 along a sectional plane II shown in FIG. 1. The arrangement 1 comprises a shaft 9 attached to a rotor 10 of the electric machine 2 and to a gear 11 of the gearbox 3. Thus, the shaft 9 couples the rotor 9 and the gear 11 directly and can be considered as the main shaft of the arrangement 1.

The arrangement 1 further comprises a first bearing 12 arranged between the rotor 10 and the gear 11 in a drive end shield 13 (DE shield) of the machine housing 6, a second bearing 14 arranged in a housing structure 15 of the gearbox housing 7 and a third bearing 16 arranged in a non-drive end shield 17 (NDE shield) of the machine housing 6.

The shaft 9 comprises an axial blind bore 18 extending from a machine side end 19 of the shaft 9 into the gearbox 3 up to a section of the shaft 9, at which the second bearing 14 is arranged. The bore 18 is realized by the shaft 9 having a through hole, which is axially closed by means of the closing element 20. The closing element 20 is a nut, which also mounts the second bearing 14 and the gear 11 of the gearbox 3. Alternatively, the closing element is a plug or a stud. The shaft may be made of a tube-formed raw part having the through hole. Alternatively, the through hole may be drilled into the shaft 9.

Furthermore, the arrangement 1 comprises a coolant insertion element 21 being arranged at the machine-side end 19 and being configured to insert and supply a coolant, e. g. a mixture of water and glycol, into the bore 18. The coolant insertion element 21 may be configured according to the one described in document WO 2016/050534 A1. When entering the bore 18, the coolant is conducted by means of a coolant conduction element 22 of the arrangement 1. The coolant conduction element 22 is arranged such that the shaft 9 rotates around it. In other words, the coolant conduction element 22 and the shaft 9 are not connected in a torque-proof manner with each other.

The coolant conduction element 22 extends inside the bore 18 along a flowing path 23 for the coolant from the machine side end 19 into the gearbox 3. The coolant conduction element 22 extends into the bore 18 up to a free blind end portion 24. The coolant conduction element 22 is tube-shaped and arranged coaxially with the bore 18. Thus, the coolant conduction element 22 separates the bore 18 into an inner section 25 and into an outer section 26, wherein the inner section 25 realizes the flow path 23.

When the coolant is supplied and inserted into the coolant conduction element 22 by means of the coolant insertion element 21 the coolant leaks the coolant conduction element 22 in the blind end portion 24. There it gets in contact with a deflection means 27 arranged in the blind end portion 24. The deflection means 27 is configured to swirl the coolant, therein generating turbulences for an improved cooling effect. Thereto, a bore-side surface 28 of the deflection means 27 is non-perpendicular to a rotation axis 29 of the shaft. The deflection means 27 is realized by the closing element 20. Thus, the nut forming the closing element has an inclined surface 28 on its bore-side. After being swirled, the coolant flows back to the machine-side end 19. Thereto, the coolant insertion element 21 has an outlet. Furthermore, the arrangement 1 comprises a pump (not shown), which is configured to pump the coolant along a closed cooling circuit.

Additionally, the coolant conduction element 22 comprises an open circumferential, namely helical, contour 30 extending in axial direction of the shaft 9 and protruding into the outer section 26. The contour 30 is realized by a contour element 31 arranged around the coolant conduction element 22. Thus, when the shaft 9 rotates, the coolant conduction element 22 stands still and by means of the contour 30 the reverse flow of the coolant is enhanced because of the contour having an effect similar to an axial pump.

FIG. 3 is a cross-sectional view of the coolant conduction element 22. As can be seen, the contour element 31 is a ribbon pushed over or wrapped around the coolant conduction element 22. The contour element 31 is made of a polymer as a molded part. Alternatively, the contour element 31 is made of a metal or a combination of a polymer and a metal. The contour element 31 is press fitted at both ends of the coolant conduction element 22. Although depicted as a ribbon in FIG. 3, the coolant conduction element 22 may be a wire, alternatively.

Thus, the arrangement 1 allows the coolant to be transported into the bore 18 along the cooling path 23. When leaving the cooling path 23 at the blind end portion 24, the coolant flowing back and cools the shaft 9, which is heated up by the rotor 10. Additionally, the coolant dissipates heat from the gearbox 3 as a lubricant film around the shaft 9 inside the gearbox 3 transports heat from the inside of the gearbox 3 to the shaft 9. Moreover, the coolant cools the bearings 12, 14, 16 and a radial shaft seal 32 arranged between the first bearing 12 and the rotor 11 for preventing the lubricant from getting in an air gap of the electric machine 2. Thus, the radial shaft seal 32 forms a system barrier 33 between the "wet" gearbox 3 and the "dry" electric machine 2.

According to a further embodiment of the arrangement 1, the flow direction of the coolant is opposite to the previous embodiment. Thus, the coolant flows from the coolant insertion element 21 to the blind end portion 24 through the outer section 26 and flows back through the inner section 25.

According to a further embodiment of the arrangement 1, the coolant conduction element 22 is configured to rotate with the rotor 10. Thereto, the coolant conduction element 22 is connected to the rotor 10 in a torque-proof manner and rotates relative to the coolant insertion element 21.

FIG. 4 is a block diagram of an embodiment of a vehicle 34 comprising an arrangement 1 according to one of the aforementioned embodiments, wherein the arrangement 1 is configured to drive the vehicle 34.

The invention claimed is:

1. An arrangement comprising:
   an electric machine,
   a gearbox,
   a shaft coupling the electric machine with the gearbox and having an axial blind bore extending from a machine-side end of the shaft into the gearbox,
   a coolant insertion element configured to supply a coolant into the bore,
   a coolant conduction element extending inside the bore from the machine-side end into the gearbox and defining a flow path for the inserted coolant, and
   a radial shaft seal arranged between a rotor and a gear attached to the shaft, wherein the radial shaft seal is coolable by the coolant.

2. The arrangement according to claim 1, wherein the bore is realized by the shaft having a through hole, which is axially closed by means of a closing element comprising a plug, a stud or a nut.

3. An arrangement comprising:
   an electric machine,
   a gearbox,
   a shaft coupling the electric machine with the gearbox and having an axial blind bore extending from a machine-side end of the shaft into the gearbox,
   a coolant insertion element configured to supply a coolant into the bore, and
   a coolant conduction element extending inside the bore from the machine-side end into the gearbox and defining a flow path for the inserted coolant,
   wherein the bore is realized by the shaft having a through hole, which is axially closed by means of a closing element comprising a plug, a stud or a nut, and
   wherein the closing element mounts a bearing supporting the shaft and/or mounts a gear of the gearbox.

4. The arrangement according to claim 1, wherein a blind end portion of the shaft has a deflection means configured to swirl the coolant.

5. The arrangement according to claim 2, wherein a deflection means is realized by the closing element.

6. The arrangement according to claim 4, wherein the deflection means has a bore-side surface being non-perpendicular to a rotation axis of the shaft.

7. The arrangement according to claim 1, wherein the coolant conduction element is arranged such that the shaft rotates around it.

8. The arrangement according to claim 1, wherein the coolant conduction element is configured to separate the bore into an inner section and into an outer section, wherein the inner section realizes the flowing path.

9. The arrangement according to claim 8, wherein the coolant conduction element comprises an open circumferential contour, extending in an axial direction of the shaft and protruding into the outer section.

10. The arrangement according to claim 9, wherein the contour is realized by a contour element arranged around the coolant conduction element.

11. The arrangement according to claim 10, wherein the contour element is a wire or a ribbon and/or made of a polymer by molding, and/or a metal.

12. A vehicle comprising the arrangement according to claim 1, wherein the arrangement is configured to drive the vehicle.

* * * * *